(12) United States Patent
Höfken et al.

(10) Patent No.: US 11,731,090 B2
(45) Date of Patent: Aug. 22, 2023

(54) HYPERBOLOID AGITATOR FOR CIRCULATING LIQUIDS, AND AGITATING AND GASSING DEVICE

(71) Applicant: INVENT Umwelt- und Verfahrenstechnik AG, Erlangen (DE)

(72) Inventors: Marcus Höfken, Erlangen (DE); Thomas Hagspiel, Postbauer-Heng (DE); Torsten Frey, Nuremberg (DE); Walter Steidl, Burgthann (DE)

(73) Assignee: INVENT Umwelt- und Verfahrenstechnik AG, Erlangen (DE)

( * ) Notice: Subject to any disclaimer, the term of this patent is extended or adjusted under 35 U.S.C. 154(b) by 296 days.

(21) Appl. No.: 17/279,356

(22) PCT Filed: Nov. 29, 2019

(86) PCT No.: PCT/EP2019/083096
§ 371 (c)(1),
(2) Date: Mar. 24, 2021

(87) PCT Pub. No.: WO2020/114907
PCT Pub. Date: Jun. 11, 2020

(65) Prior Publication Data
US 2021/0394132 A1 Dec. 23, 2021

(30) Foreign Application Priority Data

Dec. 3, 2018 (DE) .......................... 202018106871.7
Jan. 21, 2019 (DE) .......................... 102019101416.6

(51) Int. Cl.
*B01F 3/04* (2006.01)
*B01F 23/233* (2022.01)
(Continued)

(52) U.S. Cl.
CPC ...... *B01F 23/2331* (2022.01); *B01F 23/2333* (2022.01); *B01F 27/117* (2022.01);
(Continued)

(58) Field of Classification Search
CPC ............ B01F 23/2331; B01F 23/23311; B01F 23/23314; B01F 23/2333; B01F 23/23365;
(Continued)

(56) References Cited

U.S. PATENT DOCUMENTS

| | | | | |
|---|---|---|---|---|
| 1,726,125 A | * | 8/1929 | Thomas | B01F 27/81 |
| | | | | 261/87 |
| 3,490,996 A | * | 1/1970 | Kelly, Jr. | C02F 1/14 |
| | | | | 261/87 |

(Continued)

FOREIGN PATENT DOCUMENTS

| | | |
|---|---|---|
| CN | 102491545 A | 6/2012 |
| DE | 8016582 U1 | 2/1981 |

(Continued)

OTHER PUBLICATIONS

Posten, Katharina; International Search Report; PCT/EP2019/083096; dated Mar. 9, 2020; 4 pages.

*Primary Examiner* — Charles S Bushey
(74) *Attorney, Agent, or Firm* — Bradley Arant Boult Cummings LLP

(57) ABSTRACT

A hyperboloid agitator for circulating liquids, in particular water, wastewater or the like, in the centre of which a connection portion (2) for connection to a hollow agitator shaft (1) is provided, characterised in that the hyperboloid agitator is formed as a hollow body, with a central aperture (3) for supplying air being provided in the connection portion (2), and in that an air distribution device (9, 10, 11) for distributing air supplied through the aperture (3) to a plurality of air outlet openings (14) provided in the hollow body is provided downstream of the aperture (3).

18 Claims, 6 Drawing Sheets

Figure 1:
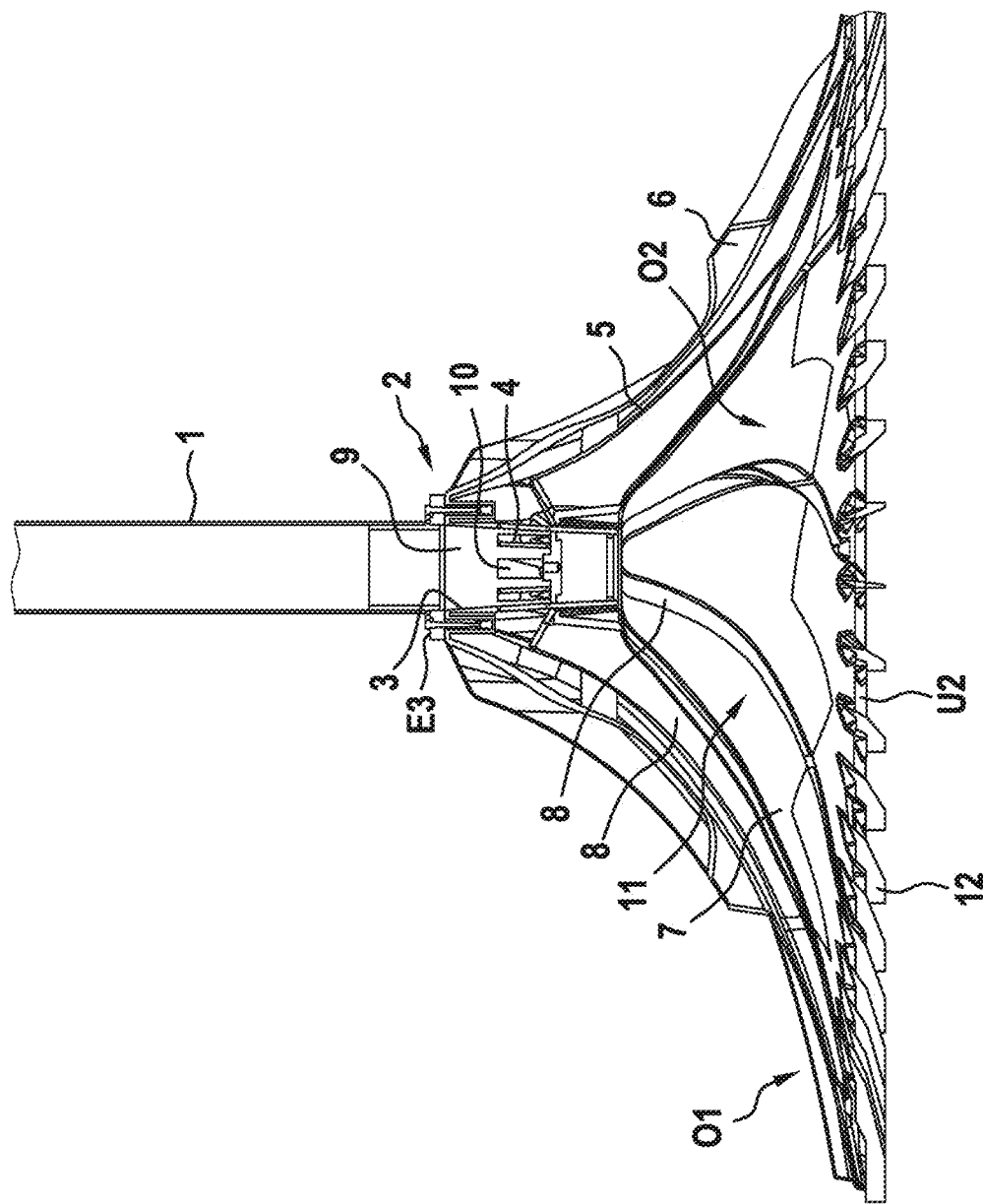

(51) Int. Cl.
*C02F 7/00* (2006.01)
*B01F 27/117* (2022.01)
*B01F 27/94* (2022.01)
*B01F 33/503* (2022.01)
*B01F 33/50* (2022.01)
*B01F 101/00* (2022.01)

(52) U.S. Cl.
CPC ............ *B01F 27/941* (2022.01); *B01F 33/50* (2022.01); *B01F 33/503* (2022.01); *C02F 7/00* (2013.01); *B01F 23/23311* (2022.01); *B01F 23/23314* (2022.01); *B01F 23/23365* (2022.01); *B01F 2101/305* (2022.01)

(58) Field of Classification Search
CPC ...... B01F 27/117; B01F 27/941; B01F 33/50; B01F 33/503; B01F 2101/305; C02F 7/00
USPC .............................................. 261/87, 91, 93
See application file for complete search history.

(56) References Cited

U.S. PATENT DOCUMENTS

| | | | | |
|---|---|---|---|---|
| 3,630,498 | A * | 12/1971 | Bielinski | B01F 23/23342 210/219 |
| 3,782,702 | A * | 1/1974 | King | B01F 23/2368 261/87 |
| 5,013,490 | A * | 5/1991 | Tanimoto | B01F 23/2368 261/87 |
| 7,784,769 | B2 * | 8/2010 | Hoefken | B01F 27/1171 210/150 |
| 8,434,744 | B2 * | 5/2013 | Hoefken | B01F 23/233 261/93 |
| 8,651,732 | B2 * | 2/2014 | Hoefken | B01F 27/117 366/330.1 |
| 9,050,567 | B2 * | 6/2015 | Hoefken | B01F 27/906 |
| 10,058,832 | B2 * | 8/2018 | Hoefken | B01F 27/1171 |
| 10,195,573 | B2 * | 2/2019 | Hoefken | B01F 27/0725 |
| 11,484,848 | B2 * | 11/2022 | Höfken | B01F 27/941 |
| 2004/0217493 | A1 | 11/2004 | Sperber et al. | |
| 2016/0279583 | A1 * | 9/2016 | Jeong | B01F 23/2331 |
| 2016/0310914 | A1 | 10/2016 | Tsuei | |

FOREIGN PATENT DOCUMENTS

| | | |
|---|---|---|
| DE | 3209283 A1 | 9/1983 |
| DE | 19823839 A1 | 12/1999 |
| DE | 19826098 C2 | 3/2002 |
| DE | 20207376 U1 | 6/2003 |
| EP | 0365013 A2 | 4/1990 |
| KR | 200447286 Y1 | 1/2010 |
| WO | WO-2020114908 A1 | 6/2020 |

* cited by examiner

HYPERBOLOID AGITATOR FOR CIRCULATING LIQUIDS, AND AGITATING AND GASSING DEVICE

The invention relates to a hyperboloid agitator body for circulating liquids, in particular water, wastewater or the like. The invention also relates to an agitator and gassing device.

A hyperboloid agitator body and an agitator and gassing device are known for example from DE 202 07 376 U1.

In the known agitator and gassing device a motor with a transmission is provided at the tip of a tower-like frame. A transmission shaft is connected to a hollow agitator shaft, at the end of which there is mounted a single-skinned hyperboloid agitator body. The hyperboloid agitator body, on its upper side, has transport ribs running radially in some sections, which transport ribs bend towards the peripheral edge of the agitator body in a tangential direction. Shearing ribs are provided on an underside of the agitator body at the peripheral edge. An annular line is situated beneath the agitator body, through which line air is fed. The air passes through a support element of the tower to the annular line.

The known agitator and gassing device requires the provision of a tower-like frame, and for aeration also the provision of an annular line. More specifically, the known agitator and gassing device is suitable for the circulation and gassing of water, wastewater or the like received in a container. By contrast, the known agitator and gassing device is unsuitable in particular for the circulation and gassing of natural bodies of water, such as ponds, lakes and the like, since here there is no solid substrate for supporting the tower-like frame. Apart from that, the known agitator and gassing device is relatively complex from a manufacturing viewpoint.

The object of the invention is to overcome the disadvantages of the prior art. In particular, a hyperboloid agitator body and an agitator and gassing device will be described which are suitable universally for circulation and gassing of liquids. In accordance with a further objective of the invention the production in particular of the agitator and gassing device shah be simplified.

In accordance with the invention the hyperboloid agitator body is formed as a hollow body, wherein a central aperture for feeding air is provided in the connection portion, and wherein an air distribution device for distributing air fed through the aperture towards a plurality of air outlet openings provided in the hollow body is provided downstream of the aperture. Both a circulation and a gassing of liquids is possible with the hyperboloid agitator body according to the invention. A hollow agitator shaft known per se may be used to feed air. In an agitator and gassing device produced with use of the proposed hyperboloid agitator body, it is possible to dispense with the provision of a tower-like frame and a separate annular line for aeration. Such an agitator and gassing device may be produced with reduced effort. It may be installed easily and quickly in situ. In particular it is not necessary to lay any aeration lines under water.

In accordance with an advantageous embodiment the air distribution device, downstream of the aperture, has an air distribution space with a plurality of air distribution apertures. Each air distribution aperture advantageously opens out into an air channel, which is delimited by walls running radially in some sections. The walls running radially in some sections bend expediently towards the peripheral edge of the hyperboloid agitator body in a tangential direction. The air outlet openings are expediently each provided at radially outer end portions of the air channels. The proposed design of the hyperboloid agitator body, in particular the air distribution device, utilises the geometry of the hyperboloid agitator body as far as possible. A compact construction results for the design of the hollow body. The provision of the air outlet openings at the radially outer end portions of the air channels contributes to a particularly effective gassing of the liquid in question.

In accordance with a particularly advantageous embodiment the hyperboloid agitator body is formed from an upper shell containing the connection portion and a lower shell connected to the upper shell, wherein the air channels are delimited by the upper shell and the lower shell. Consequently, the air channels may be produced by simply joining together the upper shell and the lower shell.

Transport ribs running radially in some sections expediently extend from the first upper side of the upper shell. The transport ribs may bend—similarly to the walls—towards the peripheral edge of the hyperboloid agitator body in a tangential direction. The walls expediently extend from a second upper side of the lower shell. In accordance with a particularly advantageous embodiment, the course of the walls corresponds to the course of the transport ribs, such that, when the upper and lower shells are joined, each transport rib underside is supported on an upper edge of one of the walls. This thus results in a particularly stable and torsion-resistant construction. Furthermore, the air channels may thus be produced in a simple way by joining the upper shell to the lower shell. The walls may also have openings or may be formed from a number of portions, with gaps situated in-between.

In accordance with a further advantageous embodiment the second upper side of the lower shell is formed in concave, preferably hyperboloid-like fashion. In other words both the upper side and the underside may be formed in hyperboloid-like fashion. A particularly compact and stable hollow body is provided when the upper shell is joined to the lower shell.

The air outlet openings are expediently provided in the vicinity of a peripheral edge of the hollow body. In particular, the air outlet openings may be provided in the vicinity of a peripheral edge of the lower shell, in particular on a second underside of the lower shell opposite the second upper side. Shearing ribs extending radially outwardly are expediently attached to the second underside.

At least one of the air outlet openings is expediently provided between 2 shearing ribs. Due to the proposed arrangement, air bubbles exiting through the air outlet openings are destroyed immediately by the effect of the shearing ribs and/or are distributed finely in the surrounding liquid. A particularly efficient gassing of the liquid is thus achieved.

The upper and the lower shells may each be produced from fibre-reinforced plastic. In accordance with an expedient embodiment the air distribution space is formed from a rotationally symmetrical, preferably conical insert, with the air distribution apertures provided in the peripheral wall of said insert. The insert may also be produced from fibre-reinforced plastic. Consequently, the hollow body may be produced easily from few parts, specifically the upper shell, the lower shell and the insert, for example by gluing.

In accordance with the invention an agitator and gassing device is also proposed, comprising
a motor,
a transmission connected drivingly to the motor and having a trans ion hollow shaft,
a fan connected to a first end of the transmission hollow shaft and provided for feeding air, an agitator shaft connected to a second end of the transmission hollow shaft, and a hyperboloid agitator body according to the invention attached to a third end of the agitator shaft.

The proposed agitator and gassing device is of simple structure. It may be quickly assembled. It may be assembled on a raft, for example for the circulation and gassing of bodies of water.

Figure 2:
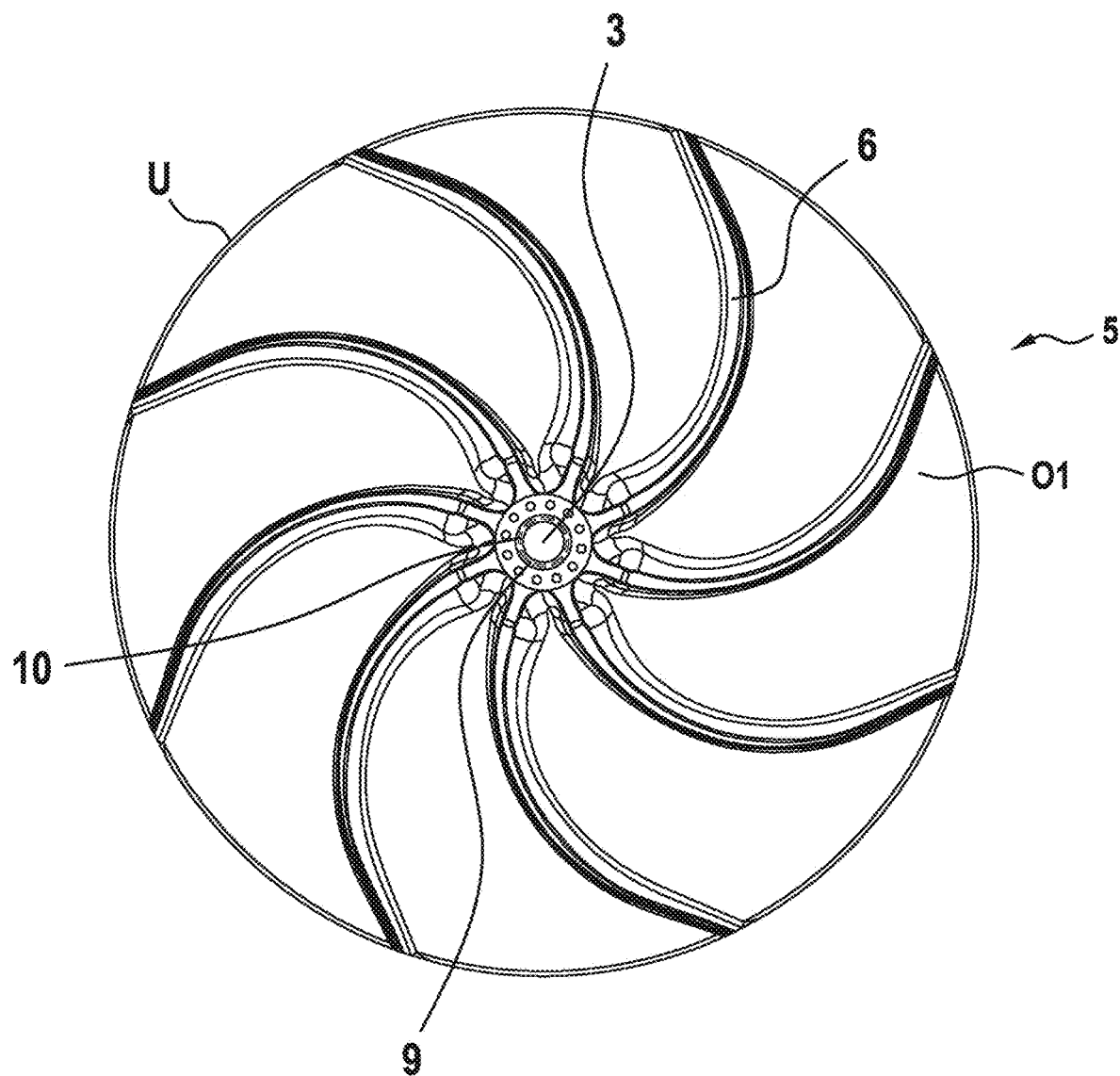
Figure 3:
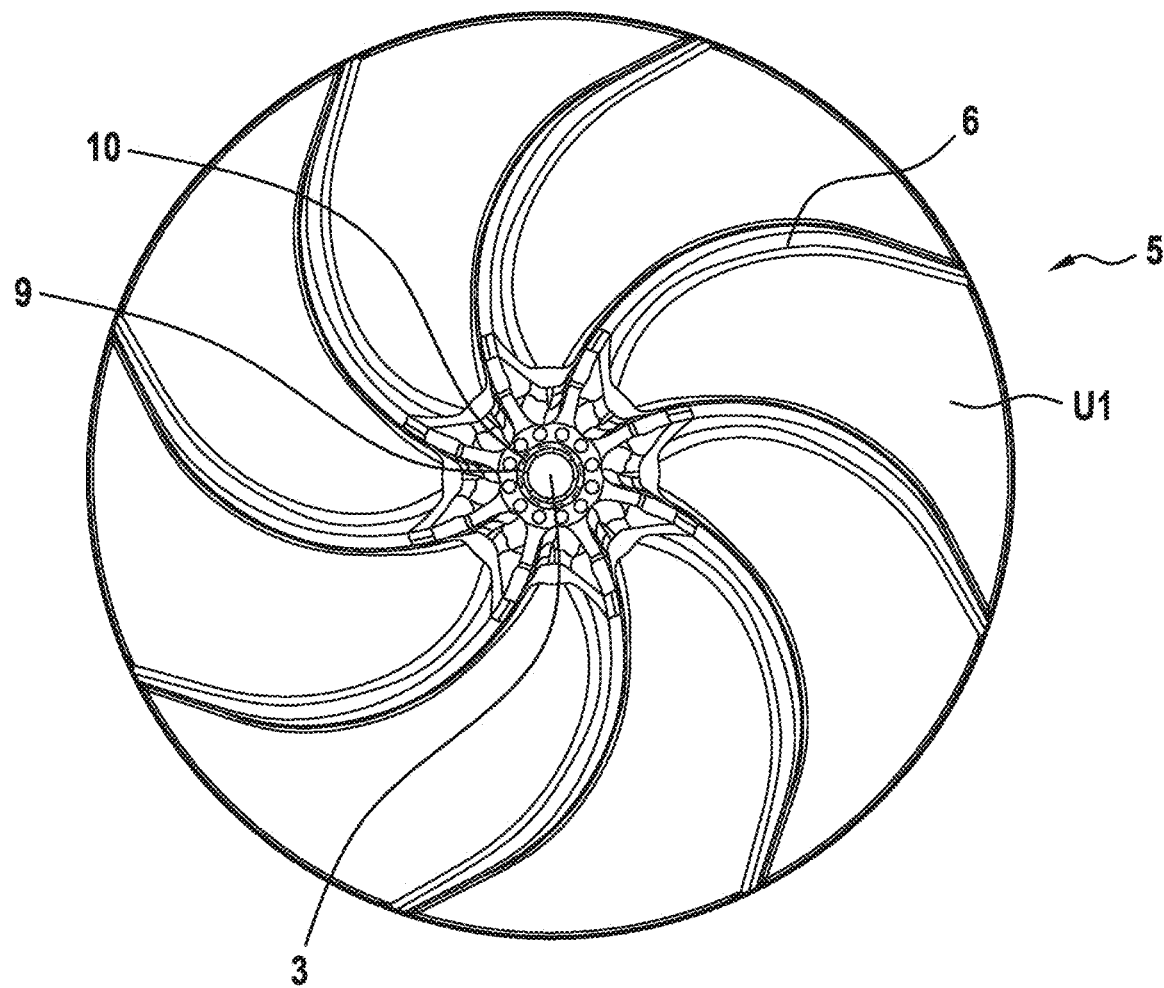
Figure 4:
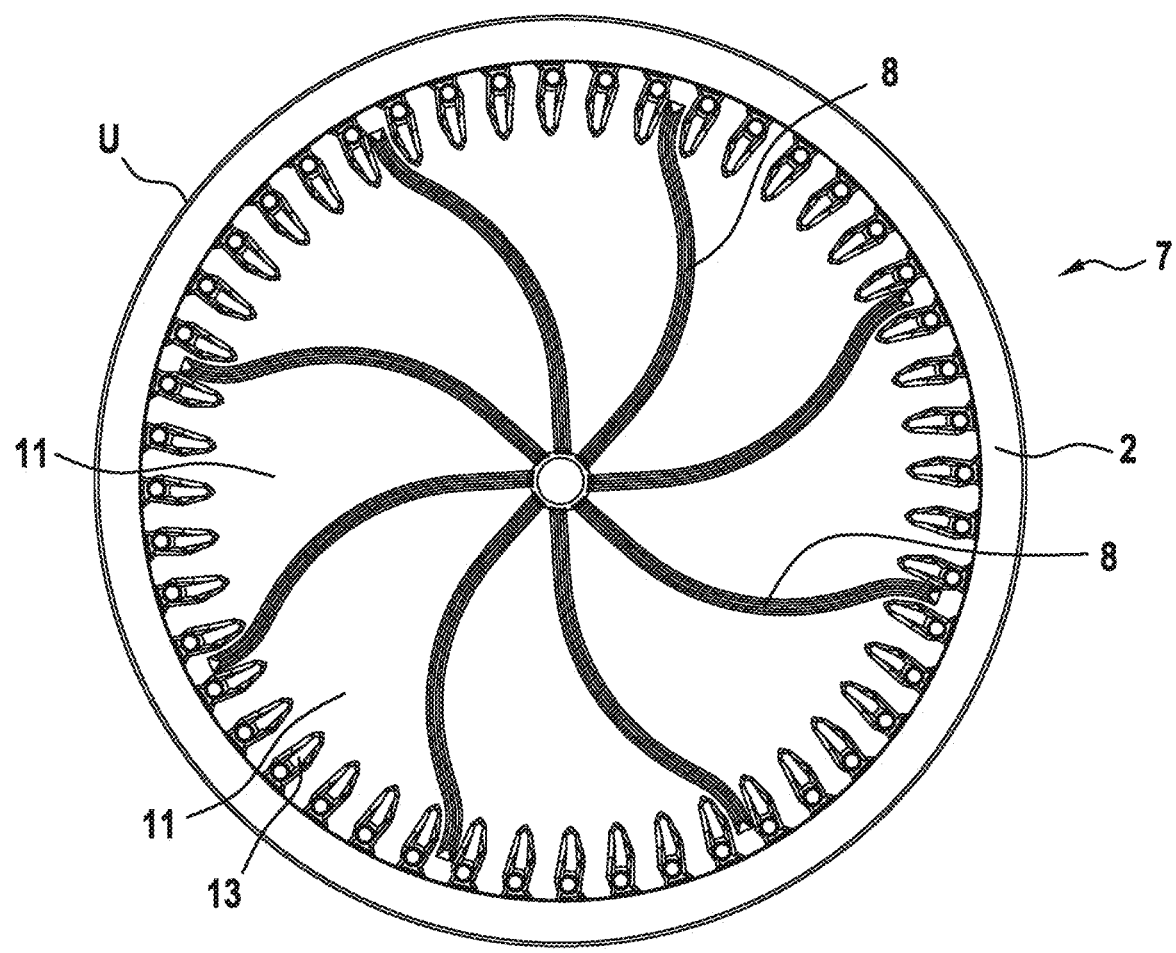
Figure 5:
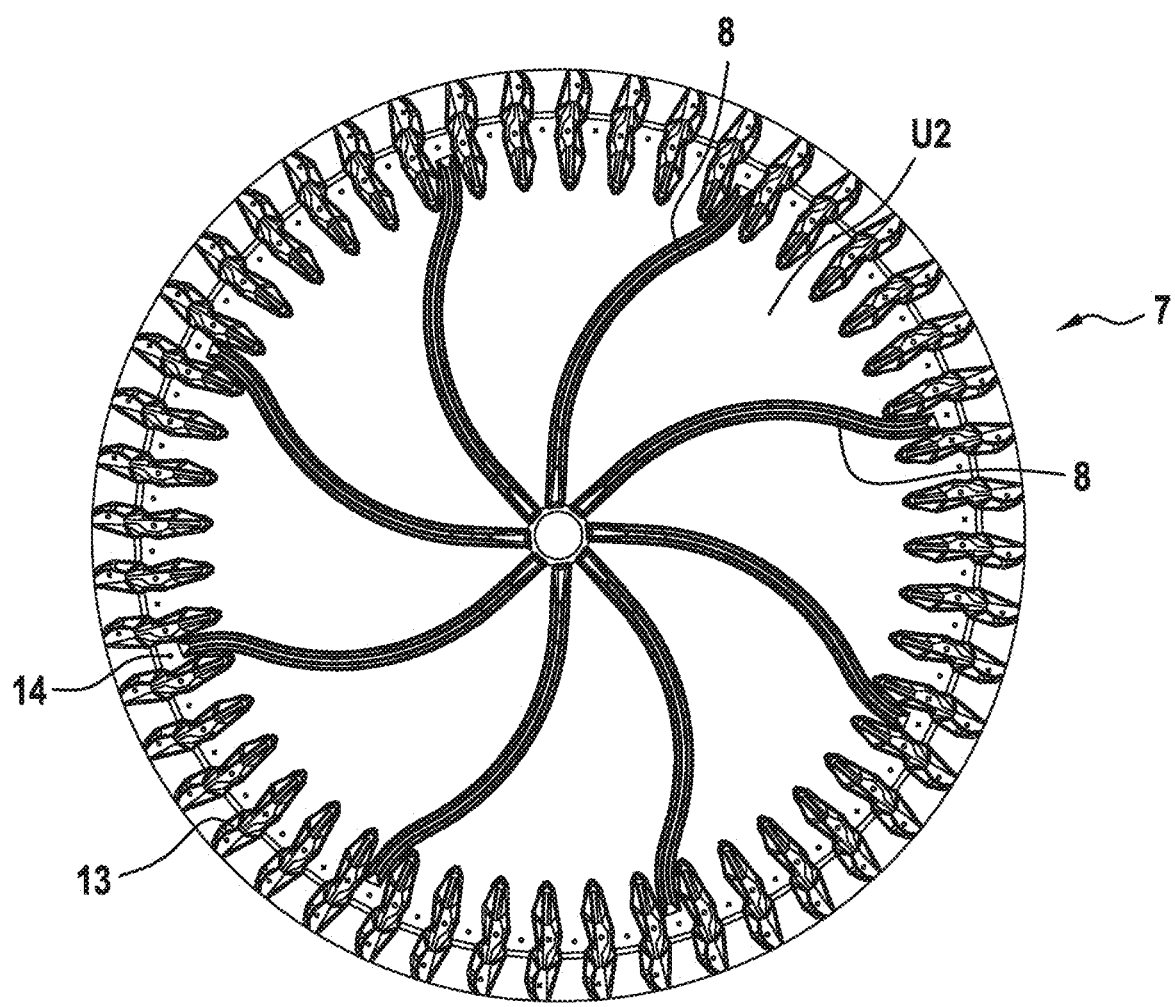
Figure 6:
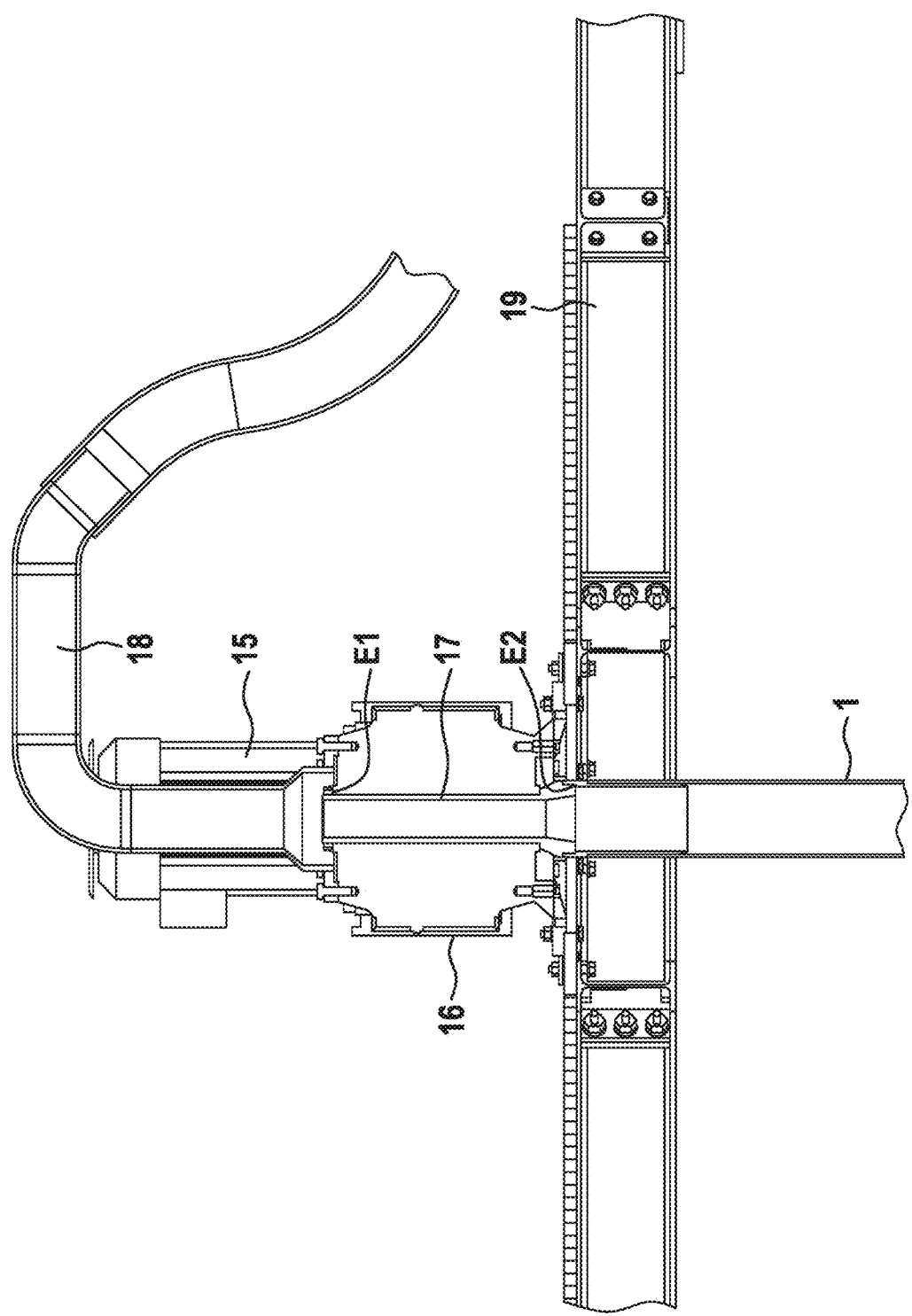

Exemplary embodiments of the invention will be explained in greater detail hereinafter with reference to the drawing, in which:

FIG. 1 shows a partially broken-open perspective view of a hyperboloid agitator body, FIG. 2 shows a plan view of an upper shell, FIG. 3 shows a view from below according to FIG. 2, FIG. 4 shows a plan view of a lower shell, FIG. 5 shows a view from below according to FIG. 4 and FIG. 6 shows a schematic sectional view through a transmission.

In FIG. 1 a hyperboloid agitator body is attached to a hollow agitator shaft 1. The hyperboloid agitator body has a central connection portion denoted by reference sign 2. The connection portion 2 has a central aperture 3 for the passage of air.

Reference sign 5 denotes an upper shell, with transport ribs 6 extending from the first upper side O1 of the upper shell. Reference sign 7 denotes a lower shell, with walls 8 extending from the second upper side O2 of the lower shell. Reference sign 9 denotes an insert which is provided downstream of the aperture 3 and forms an air distribution space 4. The insert 9 is formed in the manner of a conical beaker and has a plurality of air distribution apertures 10 on its peripheral wall. Each of the air distribution apertures 10 opens out into an air channel 11 formed by adjacent walls 8 as well as the upper shell 5 and the lower shell 7. Shearing ribs 12 are attached to a second underside U2 of the lower shell 7 at the peripheral edge thereof.

FIG. 2 shows a plan view of the first upper side O1 of the upper shell. The transport ribs extending from the first upper side O1 can be seen and run from the aperture 3 firstly in a radial direction and then bend towards the peripheral edge U in a tangential direction. The insert 9 arranged downstream of the aperture 3 and having the air distribution apertures 10 is also visible.

FIG. 3 shows a lower view according to FIG. 2. The transport ribs 6 in the form of indentations are visible on a first underside U1 of the upper shell 5.

FIG. 4 shows a plan view of the second upper side O2 of the lower shell 7. The lower shell 7 is closed at its centre, i.e. opposite the aperture 3 provided in the upper shell 5. The walls 8 extend from the second upper side O2. The walls 8—similarly to the transport ribs 6—run from the centre firstly in a radial direction and then bend towards the peripheral edge U in a substantially tangential direction. A plurality of holding devices 13, which form indentations in the second upper side O2, are situated at the peripheral edge U. The holding devices 13 are used—as can be seen in particular from FIG. 5 explained hereinafter—to receive and fasten the shearing ribs 12.

FIG. 5 shows a view from below according to FIG. 4. On a second underside U2 of the lower shell, the walls 8 in the form of indentations are visible. The holding devices 13 by contrast extend from the second underside U2. Reference is also made in this regard to FIG. 1. An air outlet opening 14 is provided between each two adjacent holding devices 13 or each two adjacent shearing ribs 12.

FIG. 6 shows a schematic sectional view through a transmission 16, which is connected drivingly to a motor 15. The transmission 16 has a transmission hollow shaft 17, the first end of which is connected to an air feed line 18. A fan connected to the air feed line 18 is not shown here. A second end E2 of the transmission hollow shaft 17 is connected to the hollow agitator shaft 1. As can be seen from FIG. 1, a third end E3 of the hollow agitator shaft 1 is connected to the hyperboloid agitator body shown in FIGS. 1 to 5.

The agitator and gassing device discernible in particular from FIGS. 1 and 6 may be attached for example to a raft 19 (see FIG. 6). A body of water, for example a pond, lake or the like, may thus be efficiently circulated and gassed.

The invention claimed is:

1. A hyperboloid agitator body for circulating liquids, in the center of which there is provided a connection portion for connection to a hollow agitator shaft, the hyperboloid agitator body comprising:
   wherein the hyperboloid agitator body is formed as a hollow body, wherein a central aperture for feeding air is provided in the connection portion;
   wherein an air distribution device for distributing air fed through the aperture towards a plurality of air outlet openings provided in the hollow body is provided downstream of the aperture;
   wherein the hyperboloid agitator body is formed from an upper shell containing the connection portion and a lower shell connected to the upper shell; and
   wherein air channels are delimited by the upper shell and the lower shell.

2. The hyperboloid agitator body according to claim 1, wherein the air distribution device has an air distribution space with a plurality of air distribution apertures downstream of the aperture.

3. The hyperboloid agitator body according to claim 2, wherein each air distribution aperture opens out into an air channel and is delimited by walls running radially in some sections.

4. The hyperboloid agitator body according to claim 3, wherein the air outlet openings are each provided at radially outer end portions of the air channels.

5. The hyperboloid agitator body according to claim 1, wherein transport ribs running radially in some sections extend from a first upper side of the upper shell.

6. The hyperboloid agitator body according to claim 3, wherein the walls extend from a second upper side of the lower shell.

7. The hyperboloid agitator body according to claim 3, wherein the course of the walls corresponds to the course of transport ribs, such that, when the upper and lower shells are joined, each transport rib underside is supported on an upper edge of one of the walls.

8. The hyperboloid agitator body according to claim 1, wherein a second upper side of the lower shell is formed in concave shape.

9. The hyperboloid agitator body according to claim 1, wherein radially outwardly extending shearing ribs are attached to a second underside of the lower shell opposite a second upper side.

10. The hyperboloid agitator body according to claim 1, wherein the air outlet openings are provided in the vicinity of a peripheral edge of the lower shell.

11. The hyperboloid agitator body according to claim 9, wherein one of the air outlet openings is provided between each two shearing ribs.

12. The hyperboloid agitator body according to claim 1, wherein the upper shell and the lower shell are each produced from fiber-reinforced plastic.

13. The hyperboloid agitator body according to claim 2, wherein the air distribution space is formed from a rotationally symmetrical insert, with the air distribution apertures provided in a peripheral wall of the insert.

14. The hyperboloid agitator body according to claim 13, wherein the insert is produced from fiber-reinforced plastic.

15. An agitator and gassing device comprising
   a motor;
   a transmission connected drivingly to the motor and having a transmission hollow shaft;
   a fan connected to a first end of the transmission hollow shaft and provided for feeding air;
   an agitator shaft connected to a second end of the transmission hollow shaft; and
   a hyperboloid agitator body according to claim 1 attached to a third end of the agitator shaft.

16. The hyperboloid agitator body of claim 1, wherein the liquids are selected from the group consisting of water and wastewater.

17. The hyperboloid agitator body according to claim 8, wherein the concave shape is hyperboloid-like.

18. The hyperboloid agitator body according to claim 13, wherein the rotationally symmetrical insert is conical.

\* \* \* \* \*